(12) United States Patent
Small et al.

(10) Patent No.: US 11,816,931 B2
(45) Date of Patent: Nov. 14, 2023

(54) CASINO SYSTEM WITH CAMERA-BASED HUMAN FULL BODY SENSING AND PLAYER ACTION PREDICTION

(71) Applicant: IGT, Las Vegas, NV (US)

(72) Inventors: David Small, Moncton (CA); David Froy, Jr., Lakeville-Westmoreland (CA); Michael Russ, Graz Styria (AT); Stefan Keilwert, St. Josef (AT); Sven Aurich, Schwanberg (AT); Fayez Idris, Dieppe (CA); Daniel Landry, Moncton (CA)

(73) Assignee: IGT, Las Vegas, NV (US)

( * ) Notice: Subject to any disclaimer, the term of this patent is extended or adjusted under 35 U.S.C. 154(b) by 82 days.

(21) Appl. No.: 17/215,451

(22) Filed: Mar. 29, 2021

(65) Prior Publication Data

US 2022/0309270 A1    Sep. 29, 2022

(51) Int. Cl.
| | | |
|---|---|---|
| *A63F 13/213* | (2014.01) | |
| *A63F 13/25* | (2014.01) | |
| *G06V 40/20* | (2022.01) | |
| *G07F 17/32* | (2006.01) | |
| *A63F 3/00* | (2006.01) | |
| *G06V 40/10* | (2022.01) | |
| *G06V 40/16* | (2022.01) | |

(52) U.S. Cl.
CPC .......... *G06V 40/23* (2022.01); *A63F 3/00157* (2013.01); *G06V 40/103* (2022.01); *G06V 40/176* (2022.01); *G07F 17/3211* (2013.01)

(58) Field of Classification Search
None
See application file for complete search history.

(56) References Cited

U.S. PATENT DOCUMENTS

| | | | |
|---|---|---|---|
| 2020/0168036 A1* | 5/2020 | Schwartz | G07F 17/3206 |
| 2020/0286339 A1* | 9/2020 | Peek | A63F 3/0605 |
| 2021/0350676 A1* | 11/2021 | Peek | A63F 3/06 |

* cited by examiner

*Primary Examiner* — Samuel D Fereja
(74) *Attorney, Agent, or Firm* — SAGE PATENT GROUP

(57) ABSTRACT

A gaming system, computer-implemented method and gaming device are operable enhance player experience using image data. A system includes a processor circuit and a memory including machine-readable instructions that, when executed by the processor circuit, cause the processor circuit to perform operations. Such operations include receiving, from a camera, image data that includes visual signals corresponding to a player and determining player action components from the image data. The player action components include multiple different player attributes that correspond to an emotional state of the player. Operations further include, based on the different player attributes, determining a predicted action of the player and causing a casino related action that corresponds to the predicted action.

19 Claims, 11 Drawing Sheets

CASINO SYSTEM WITH CAMERA-BASED HUMAN FULL BODY SENSING AND PLAYER ACTION PREDICTION

BACKGROUND OF THE DISCLOSURE

It may be challenging to provide real time dynamic targeted experiences to casino players to give them a unique experience each time they enter a venue. Determining what features and experiences that may be offered to players may be difficult based on the different states of mind of a given player. Determining a player's state of mind may be helpful in providing a play experience that is particularly tailored to the player at that time.

BRIEF SUMMARY OF THE DISCLOSURE

Some embodiments are directed to a system that includes a processor circuit and a memory including machine-readable instructions that, when executed by the processor circuit, cause the processor circuit to perform operations including receiving, from a camera, image data that corresponds to a player. Operations may further include determining player action components from the image data. Player action components include multiple different player attributes that correspond to an emotional state of the player. Operations include, based on the different player attributes, determining a predicted action of the player and causing a casino related action that corresponds to the predicted action.

Some embodiments herein are directed to an EGM that includes a processor circuit, a camera and a memory comprising machine-readable instructions that, when executed by the processor circuit, cause the processor circuit to perform operations including receiving, from the camera, image data corresponding to a player playing the EGM. Operations include determining player action components from the image data. The player action components include multiple different player attributes that correspond to the player. Operations include, based on the different player attributes, determining a predicted action of the player and causing a display device to display a message to interrupt the predicted action of the player.

Some embodiments herein are directed to methods that include receiving, from multiple cameras, image data that corresponds to a player in a casino, determining a player identity of the player using the image data and a player database including stored player data for multiple players, and determining a predicted action of the player based on the image data and the player database. Operations may include causing a casino related action that corresponds to the predicted action, comparing an actual action of the player with the predicted action of the player, and updating the player database based on the comparing operation and the casino related action.

DETAILED DESCRIPTION OF THE DISCLOSURE

Figure 1:
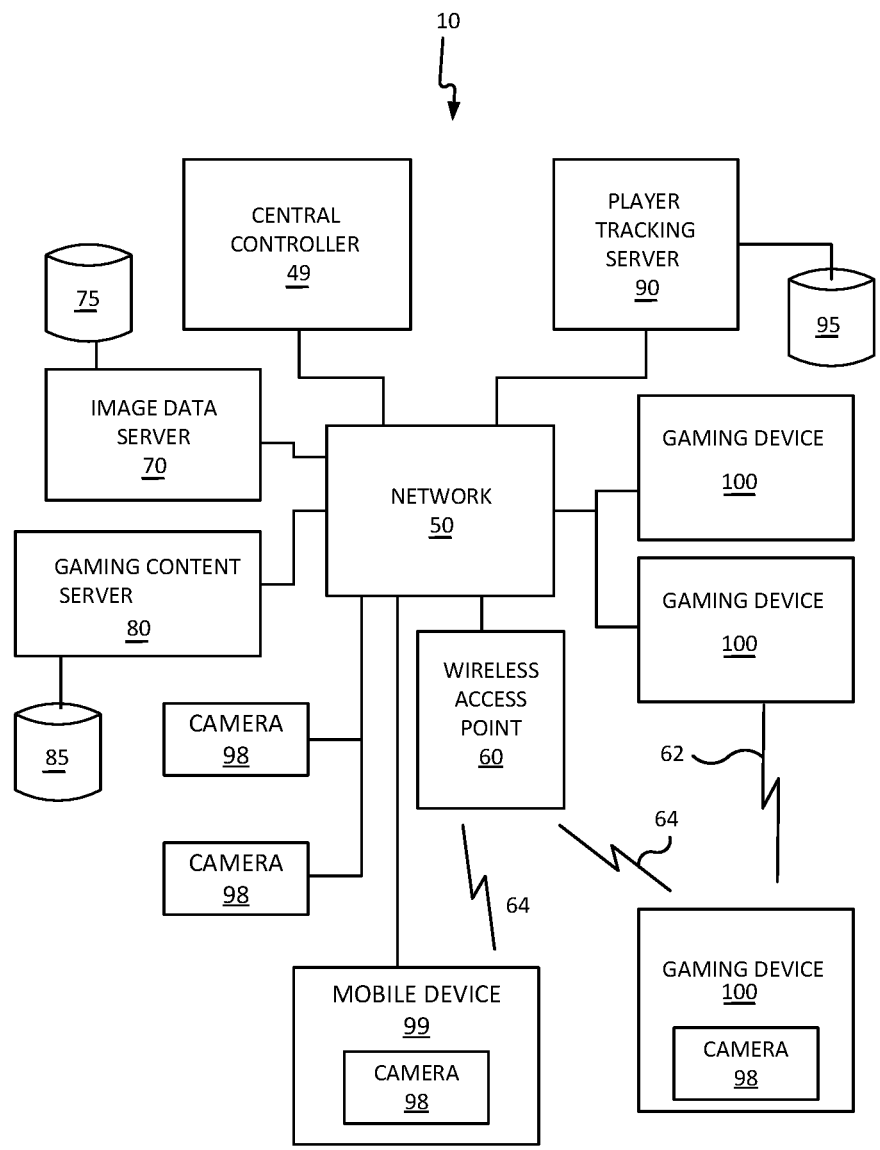
FIG. 1 illustrates a casino management system including a plurality of gaming devices for enhancing player experience using image data according to some embodiments herein.

Embodiments herein may use full body sensing through the casino surveillance cameras to detect the psychological and physiological state of a player when they enter the casino. Different player attributes may include speed, gait, bp, thermal profile and other biometric factors. Based on this, a casino app could then plan out and optimize their casino visit for them and suggest the best experience for them, such as various games to play, what time of food they might like, alcoholic or non-alcoholic drinks, music type on the EGM's etc. for that particular visit.

Embodiments herein provide a camera-based prediction application that is integrated into an EGM and that is configured to observe the current player and trying to predict a player's future actions by analyzing body part movement direction, movement speed, gaze direction, gaze duration, body posture, facial expressions and/or head movement, among others.

During play, embodiments herein may predict a player's intention during gameplay regarding what the player intends to do next and/or how the player intends to interaction with the game in subsequent operations. In some embodiments, a predicted player's intentions may be used for a framework to decide whether to trigger dynamic, player-focused game mechanisms or not.

While it may be challenging to provide real time dynamic targeted experiences to casino players to give them a unique experience each time they enter a venue, techniques discussed herein may enable a venue to keep the players interested by offering them something new or something more familiar that may depend on their state of mind. For example, camera based full body sensing can provide useful biometric info and enable the venue to match the players experience with their mood.

Additionally, some embodiments provide that predicting a next action during play enable the game to prompt information corresponding to the predicted next action. For example, in the case in which a player intends to press button A to select an option. The game may be able to predict the player's intent prior to the player pressing the button and prompt information in anticipation of the player's intent. In this manner, the game and the play experience may be perceived as more intelligent as the game reacts depending on context dynamically. Examples may include when a player intends to cash out, increase or decrease a bet of select a high volatile/low volatile bonus configuration.

Some embodiments may use multi camera based biometric sensors and analysis software, including IR video cameras, RGB video and specialized software that can measure mood through facial analysis, iris analysis, pulse, body temperature, gait, speed, blood oxygen levels flush response, sweat response, etc. The outputs of these cameras could also be integrated with EGM based cameras and the Player Tracking Systems to provide a full picture of the players state of mind, in real time. As used herein, a camera may include any type of image capture device that may capture image data corresponding to the objects in the visible and/or non-visible spectrum. For example, in addition to capturing image data in the visible spectrum, a camera as described herein may capture image data corresponding to thermal imaging, ultraviolet, and/or infrared, among others.

In some embodiments, a camera may observe the player's hands including object recognition identifying the player's hands, position in 3d-space and hand movement. Machine learning (ML) components may be applied to the image data to understand the type of hand-movement that leads to interacting with a specific button/UI element. ML components may calculate probabilities of intended interaction. An event engine may prompt the player if calculated intended interaction exceeds a given threshold.

Some embodiments provide that ML components could be centralized and linked across multiple machines (as a system component) to increase accuracy of estimations through receiving ML input from multiple machines in parallel and enable to system to learn more efficiently.

In some embodiments, data corresponding to players may be collected and analyzed. In some embodiments, such data may provide additional value to game operators. In some embodiments, a complete stand-alone system may be provided and/or access to data through subscription or Software as a Service (SaaS) may be provided and may interact with existing camera systems and/or devices. Some embodiments provide that systems disclosed herein may be integrated as a module within a casino floor manager product and/or player tracking system.

Some embodiments provide a potential of increased revenue if a player does not cash-out and instead continues playing. Some embodiments may provide improved player experience and feel of a "smart game" that can almost read the player's mind. Some embodiments provide a dynamic and context sensitive game interaction with player.

Multiple cameras installed in a location, cameras on mobile devices that are carried by a visitor of the venue and/or cameras in EGMs may provide inputs. Various ones of the cameras may be connected to a computer or server which include an AI-trained system that is configured to recognize and track a user as they enter the venue. Various methods such as facial recognition, gait tacking, speed, etc. will be used to facilitate recognizing and tracking a user as they move throughout the venue. The AI system may be implemented in software or in a combination of software and accelerated hardware and may use various specialized cores on local processors, GPU-specific cards and/or other FPGA accelerator boards. In some embodiments, the AI system may be run locally while in other embodiments the AI system may be operated on a cloud.

Some embodiments provide that when a user is tracked by the camera system, the user may be tracked in 3D space. In some embodiments, the system includes a map of the venue. Each camera may be assigned to a specific area on the map as well as a field of view that will be mapped. These will be used by the AI system to facilitate tracking of the user. When a user is tracked by multiple cameras at the same time, the combined data can be used to help facilitate tracking the user on the map. Some embodiments provide that tracking the user may be used for generating biometric data corresponding to the user.

When the player sits at an EGM equipped with a camera, additional biometric and mood data from the EGM camera can be combined with the other venue cameras. In some embodiments, the user's mobile device may be used to provide input for biometrics. For example, data generated and/or collected may be provided using an accelerometer, gyroscope, as well as WIFI, Bluetooth and/or other sensors. Some embodiments provide that wearable devices such as smart watches and other biometric data may be also used to capture data from the user.

By connecting to the local network, the mobile data network on the user's mobile device, may send alerts to the user. Based upon the user's bio feedback as well as location and movement tracking in the venue, the system may facilitate a better user experience. Player notifications may be sent via the EGM. By tracking the player, if a player becomes stressed or unhappy, the system can suggest things to the user to maximize their experience.

Embodiments of methods, systems and devices discussed herein may provide a variety of applications. For example, methods, systems and devices may be used to provide responsible gaming services by identifying behaviors and/or emotional indicators that may trigger an action by the casino. In some embodiments, methods, systems and devices may provide for self-exclusion of tracking players based upon detecting who they are.

Some embodiments may prompt push notifications on their mobile based on biometric behavior factors. For example, when a player's behavior is recognized as "Needs restroom visit", a push notification may be sent to the player explaining or showing the location of a restroom. Other examples include notifications corresponding to a bar, an ATM, an exit, and/or the cashier, among others. For example, a prompt sent to a player may be "You look thirsty, don't you want to have another drink?" This prompt may be followed by providing the opportunity to directly order drink via the app or receive information regarding a bar.

In some embodiments, system herein may be able to determine that a visitor has a disability and may benefit from special assistance and/or accommodations. For example, the image data may be used to identify that a player is in a wheelchair and needs help at a gaming machine, such as removing a casino chair and/or automatically notifying casino staff. Some embodiments may provide accommodations to a visually impaired player such as having EGMs that are connected to the system provide acoustic aids and/or warnings to safely guide the visually impaired player through the casino. In some embodiments, if an actively played EGM knows, via the system, that the player is visually impaired, the EGM may automatically trigger nonvisual support, such as audio-visible-tactile game descriptions.

Embodiments herein may detect medical duress in a player and automatically send medical attention. For example, the system may determine that a player has fallen and may send staff to the player to provide assistance.

In some embodiments, a players mood and/or emotional state may be linked to EGM wins and jackpots. For example, bonuses and/or jackpot wins may be generated to match and/or change the players mood. Examples include free meals, a bottle of wine, and/or concert tickets based on their mood and the music they may be listening to. Some embodiments may also provide churn prevention. Some embodiments provide that if a player leaves an EGM and their mood is bad or angry, the system may send a message to their mobile device inviting them to try a different game with some free credits or offer a dinner and free credits to go back and play the same game.

In some embodiments, pattern detection of movement of players on the casino floor may be provided. For example, a system may detect if players seem to be lost and offer help to find their destination. Some embodiments may compare movement patterns of other players and determine a next best action for the player.

In some embodiments, the system may detect that the player feels unwell or anxious when other people play on a machine next to him. In such embodiments, the system may offer to transfer the player to the same game that is on a different EGM that is in a quieter area.

In some embodiments, the system may be aware of selling opportunities along an estimated/predicted path of the player and use this information to advertise other casino offerings.

Some embodiments provide waiting time information for players corresponding to features in the casino, such as for a table at a restaurant, the availability of a show or performance, of the line at a given vendor. For example, the player may receive information that the wait time at a coffee shop is only 1 minute or that a discount purchase may be offered if an order is placed within 5 minutes.

Some embodiments provide that the system could be coupled with a casino's reward program to offer discounts if players consume and/or purchase at proposed selling points. In some embodiments, the system could be coupled with a casino system to propose and plan a casino experience for the player. For example, in some embodiments, a plan may include the player being hungry at a certain time, to play slots, to meet a friend at the lobby at 5, and have a drink at the bar at 5:30, based on available information such as player history, casino system EGM occupancy, and/or automated table reservation at restaurants, among others. The system may plan and propose options, the player may accept the plan, and the system may remind and guide the player to cover all planned events.

In some embodiments, when a system detects that a player has experienced a significantly positive event, such as a large win, the system may detect the excited movements of the player and generate an avatar that mimics the player's excited movements. For example, the excited player may dance and the avatar may also dance with the player. In some embodiments, the EGM may switch to a "Party mode" with dance music.

In some embodiments, multiple machines have the capability, able to detect and/or predict social interactions between adjoining players or players in a bank of closely placed EGMs. In such embodiments, the system may coordinate game play between the different players. For example, the system may launch alternative, paired and/or banked, bonus events to engage multiple players and create a social event. Some embodiments include linked adjoining EGMs or EGMs in a pod or bank with predictions that may account for player interactions within a relevant localized area.

Some embodiments may detect if a player is going to leave and offer a new game and/or a free play to entice the player to keep playing.

Some embodiments include predicting which EGM player will play next and tracking which EGMs they play. Such data may be aggregated and used to improve future predictions and thus improve the accuracy of the system.

Some embodiments provide that in addition to a camera based biometric determination of player state of mind, camera data may also provide posture data, and/or movement data as distinguishing factors.

Reference is now made to FIG. 1, which illustrates a casino management system 10 including a plurality of gaming devices 100. The casino management system 10 may be located, for example, on the premises of a gaming establishment, such as a casino, in a private residence, or may include components that are located at different locations. The gaming devices 100 may be in communication with each other and/or a central controller 49 through a data communication network 50, or remote communication link. The data communication network 50 may be a private data communication network that is operated, for example, by the gaming facility that operates the gaming device 100, a publicly accessible data communication network such as the Internet, or a combination thereof. Communications over the data communication network 50 may be encrypted for security. The central controller 49 may be any suitable server or computing device which includes at least one processor circuit, such as a processor, and at least one memory or storage device. Each gaming device 100 may include a processor circuit that transmits and receives events, messages, commands or any other suitable data or signal between the gaming device 100 and the central controller 49 and/or other gaming devices 100. The gaming device processor is operable to execute such communicated events, messages or commands in conjunction with the operation of the gaming device 100. Moreover, the processor of the central controller 49 is configured to transmit and receive events, messages, commands or any other suitable data or signal between the central controller 49 and each of the individual gaming devices 100. In some embodiments, one or more of the functions of the central controller 49 may be performed by one or more gaming device processors. Moreover, in some embodiments, one or more of the functions of one or more gaming device processors as disclosed herein may be performed by the central controller 49.

Figure 2:
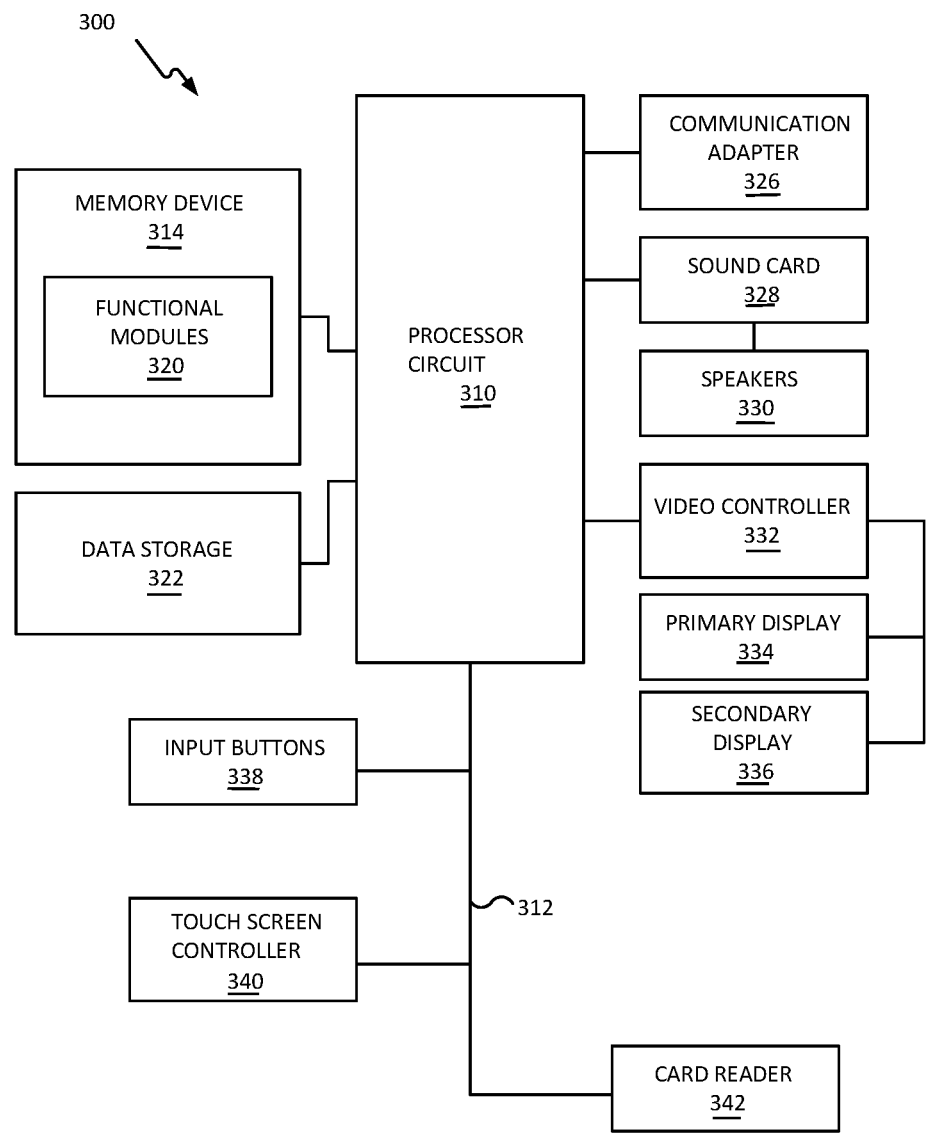
FIG. 2 is a block diagram that illustrates various components of a computing device for enhancing player experience using image data, which may embody or be included as part of the devices, systems, and/or components above, according to some embodiments.

A wireless access point 60 provides wireless access to the data communication network 50. The wireless access point 60 may be connected to the data communication network 50 as illustrated in FIG. 2, or may be connected directly to the central controller 49 or another server connected to the data communication network 50.

One or more content servers, such as a gaming content server 80, may also be connected through the data communication network 50. Similarly, the gaming content server 80 may manage delivery of the gaming content to the user of a gaming device 100. The gaming content may be stored in a gaming content database 85. An image data server 70 may receive, process, manage access, update, store, make consensus determinations, and/or make determinations regarding predicted actions and/or cause casino related actions to be performed. The image and related data may be stored in an image data database 75. The image data server 70 and a gaming content server 80 may be implemented within or separately from each other. The image data server 70 and a gaming content server 80 may also be implemented within or separately from the central controller 49.

A player tracking server 90 may also be connected through the data communication network 50. The player tracking server 90 may manage a player tracking account that tracks the gameplay and spending and/or other player preferences and customizations of a player, i.e., the user of the gaming device 100, manages loyalty awards for the player, manages funds deposited or advanced on behalf of the player, and other functions. Player information managed by the player tracking server 90 may be stored in a player information database 95. In some embodiments, the player information database 95 and/or the player tracking server 90 may include and/or provide information that may be used by the image data server 70 to detect excluded players. For example, data corresponding to an excluded player may be received responsive to the excluded player submitting and/or inserting a player tracking card to a gaming table or machine.

The gaming devices 100 communicate with one or more elements of the system 10 to coordinate providing streaming video content and synchronized gaming content. For example, in some embodiments, a gaming device 100 may communicate directly with another gaming device 100 over a wireless interface 62, which may be a WiFi link, a Bluetooth link, an NFC link, etc. In other embodiments, the gaming device 100 may communicate with the data communication network 50 (and devices connected thereto, including EGMs) over a wireless interface 64 with the wireless access point 60. The wireless interface 64 may include a WiFi link, a Bluetooth link, an NFC link, etc. In still further embodiments, the gaming device 100 may communicate with other gaming devices 100 or other devices over the wireless interface 62 and the wireless access point 60 over the wireless interface 64. In these embodiments, the wireless interface 62 and the wireless interface 64 may use different communication protocols and/or different communication resources, such as different frequencies, time slots, spreading codes, etc. For example, in some embodiments, the wireless interface 62 may be a Bluetooth link, while the wireless interface 64 may be a WiFi link.

The wireless interfaces 62, 64 allow the gaming devices 100 and/or central controller 49 to coordinate providing player data from gaming devices 100.

Embodiments may include one or more cameras 98. As used herein, a camera 98 may include a device including any type of image capture device that is configured to generate image data that may include visual signals. Embodiments herein provide that a camera 98 may be a stand-alone camera 98 and/or may be integrated into another device. For example, a camera 98 may be a component of a gaming device 100 and/or a mobile device 99. One or more cameras 98 may be connected via the network 50 using wired and/or wireless interfaces 62, 64.

Systems herein may be configured to communicate corresponding to a specific player using a mobile device 99 that is associated with that player and that is operable to communicate over the network using wired and/or wireless interfaces 62, 64.

Reference is now to FIG. 2, which is a block diagram that illustrates various components of a computing device 300, which may embody or be included as part of the devices, systems, and/or components above, according to some embodiments. As shown in FIG. 2, the computing device 300 may include a processor circuit 310 that controls operations of the computing device 300. Although illustrated as a single processor, multiple special purpose and/or general-purpose processors and/or processor cores may be provided in the computing device 300. For example, the computing device 300 may include one or more of a video processor, a signal processor, a sound processor and/or a communication controller that performs one or more control functions within the computing device 300. The processor circuit 310 may be variously referred to as a "controller," "microcontroller," "microprocessor" or simply a "computer." The processor circuit 310 may further include one or more application-specific integrated circuits (ASICs).

Various components of the computing device 300 are illustrated in FIG. 2 as being connected to the processor circuit 310. It will be appreciated that the components may be connected to the processor circuit 310 and/or each other through one or more buses 312 including a system bus, a communication bus and controller, such as a USB controller and USB bus, a network interface, or any other suitable type of connection.

The computing device 300 further includes a memory device 314 that stores one or more functional modules 320 for performing the operations described above. Alternatively, or in addition, some of the operations described above may be performed by other devices connected to the network, such as a network 50 illustrated in FIG. 1, for example. The computing device 300 may communicate with other devices connected to the network to facilitate performance of some of these operations. For example, the computing device 300 may communicate and coordinate with certain displays to identify elements of a race being displayed by a particular display.

The memory device 314 may store program code and instructions, executable by the processor circuit 310, to control the computing device 300. The memory device 314 may include random access memory (RAM), which can include non-volatile RAM (NVRAM), magnetic RAM (ARAM), ferroelectric RAM (FeRAM) and other forms as commonly understood in the gaming industry. In some embodiments, the memory device 314 may include read only memory (ROM). In some embodiments, the memory device 314 may include flash memory and/or EEPROM (electrically erasable programmable read only memory). Any other suitable magnetic, optical and/or semiconductor memory may operate in conjunction with the gaming device disclosed herein.

The computing device 300 may include a communication adapter 326 that enables the computing device 300 to communicate with remote devices, such as the wireless network, another computing device 300, and/or a wireless access point, over a wired and/or wireless communication network, such as a local area network (LAN), wide area network (WAN), cellular communication network, or other data communication network, e.g., the network 50 of FIG. 1.

The computing device 300 may include one or more internal or external communication ports that enable the processor circuit 310 to communicate with and to operate with internal or external peripheral devices, such as a sound card 328 and speakers 330, video controllers 332, a primary display 334, a secondary display 336, input buttons 338 or other devices such as switches, keyboards, pointer devices, and/or keypads, a touch screen controller 340, a card reader 342, currency acceptors and/or dispensers, cameras, sensors such as motion sensors, mass storage devices, microphones, haptic feedback devices, and/or wireless communication devices. In some embodiments, internal or external peripheral devices may communicate with the processor through a universal serial bus (USB) hub (not shown) connected to the processor circuit 310. Although illustrated as being integrated with the computing device 300, any of the components therein may be external to the computing device 300 and may be communicatively coupled thereto. Although not illustrated, the computing device 300 may further include a rechargeable and/or replaceable power device and/or power connection to a main power supply, such as a building power supply.

In some embodiments, the computing device 300 may include a head mounted device (HMD) and may include optional wearable add-ons that include one or more sensors and/or actuators. Including ones of those discussed herein. The computing device 300 may be a head-mounted mixed-reality device configured to provide mixed reality elements as part of a real-world scene being viewed by the user wearing the computing device 300.

Figure 3:
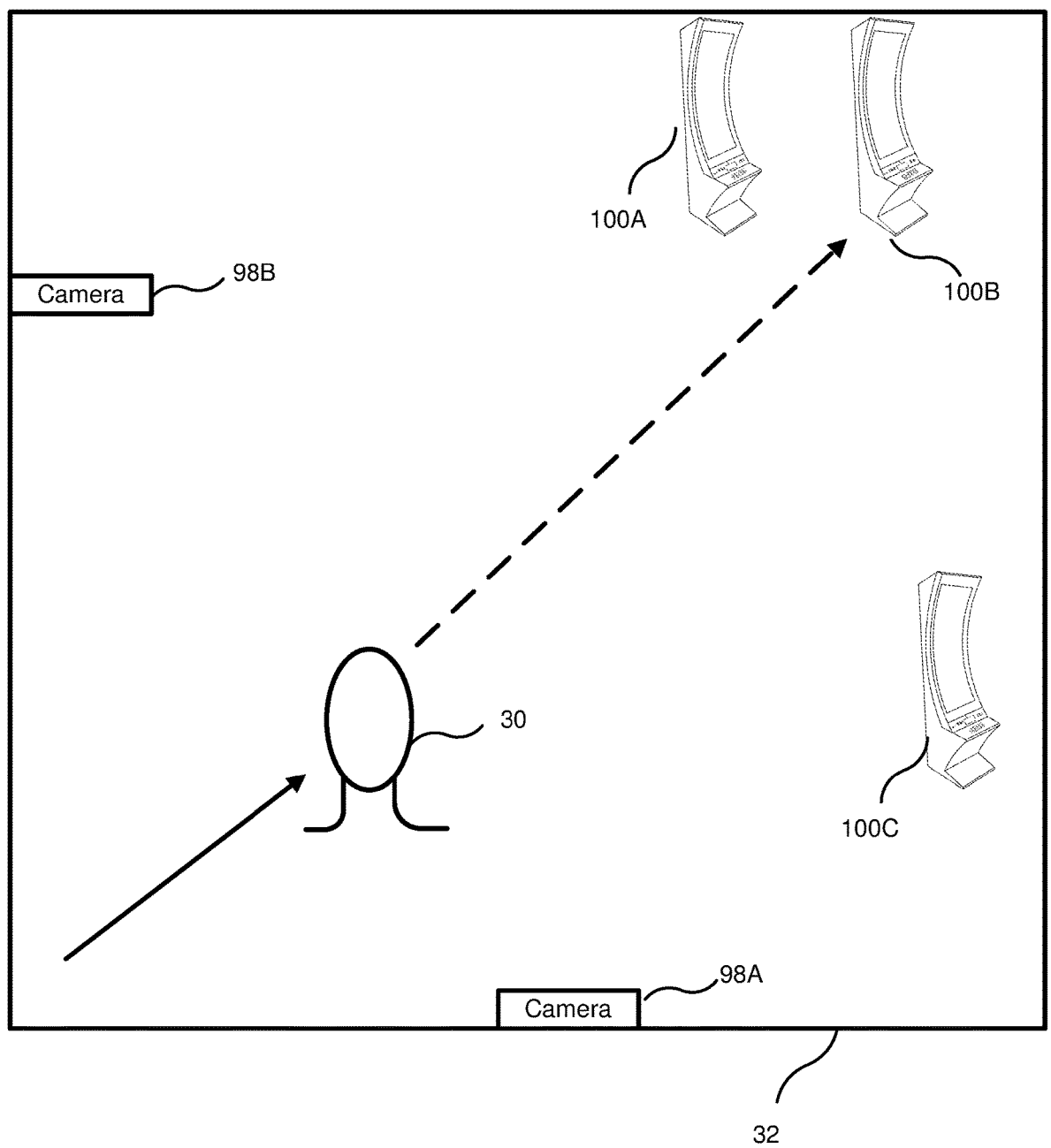
FIG. 3 is a schematic top view of a casino floor according to some embodiments herein.

Reference is now made to FIG. 3, which is a schematic top view of a casino floor according to some embodiments herein. In some embodiments, multiple cameras 98A, 98B may be operating in a casino space 30 that includes one or more EGMs 100. One or more of the multiple cameras 98A, 98B may generate image data corresponding to one or more players 30. Although not illustrated in FIG. 3, additional cameras 98 may be integrated into one or more of the EGMs 100 and/or in a mobile device that is associated with the player 30.

Based on the image data, embodiments herein may generate a predicted action of the player 30. In some embodiments, the image data may be used in combination with a player database and/or an image data server that may store historical player image and action data and that may generate predicted actions of the player. Some embodiments provide that actual actions of the player 30 may be compared to the predicted actions and that the results of the comparison may be provided to systems herein to update the stored player data.

As illustrated, the player 30 may be predicted, based on image data received by one or more cameras, to be on his/her way to a specific feature in the casino space 32. For example, the player 30 may be predicted to go to EGM 100B. Based on this prediction, the system may identify player's preferences corresponding to EGM 100B and have the EGM configured in accordance with the preferences of the player 30. In some embodiments, the system realizes that EGM 100B is occupied and may send the mobile device of the player 30 an invitation to play the same game at a different EGM 100A. In some embodiments, the system may send a message to the mobile device of the player 30 an invitation to play a different but similar game.

Figure 4:
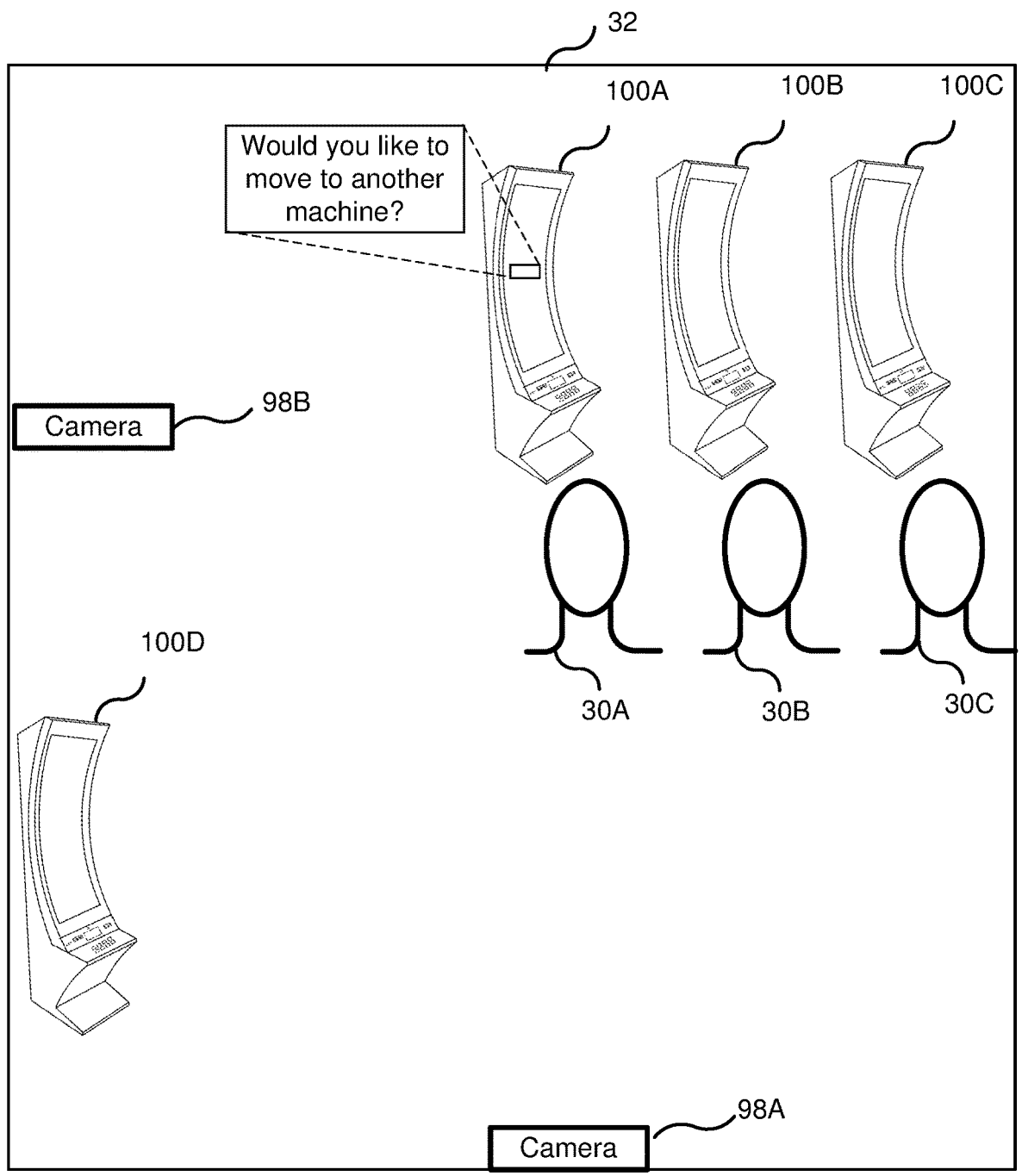
FIG. 4 is a schematic top view of a casino floor according to some embodiments herein.

Reference is now made to FIG. 4, which is a schematic top view of a casino floor according to some embodiments herein. In some embodiments, multiple cameras 98A, 98B may be operating in a casino space 30 that includes one or more EGMs 100. One or more of the multiple cameras 98A, 98B may generate image data corresponding to one or more players 30. In some embodiments, multiple players 30A, 30B, 30C may be playing EGMs 100A, 100B, 100C that are located proximate to one another in a bank of EGMs 100A, 100B, 100C. In some embodiments, the image data may be used to determine that the players 30A, 30B, 30C are socially engaged with one another. In such cases, the social engagement may have been generated between the players while playing in the casino and/or may predate the casino gaming session. In some embodiments, features provided by the EGMs 100A, 100B, 100C may be coordinated with one another to enhance comradery among the players 30A, 30B, 30C. Examples may include game play and/or awards that result from coordinated events in the gaming session.

In some embodiments, image data may be used to determine that one of the players 30A is made to feel uncomfortable due to the actions and/or presence of the other two players 30B, 30C. In such embodiments, EGM 100A corresponding to player 30A may display an invitation for the player 30A to move to a different EGM 100D that is further from the other players 30B, 30C.

Figure 5:
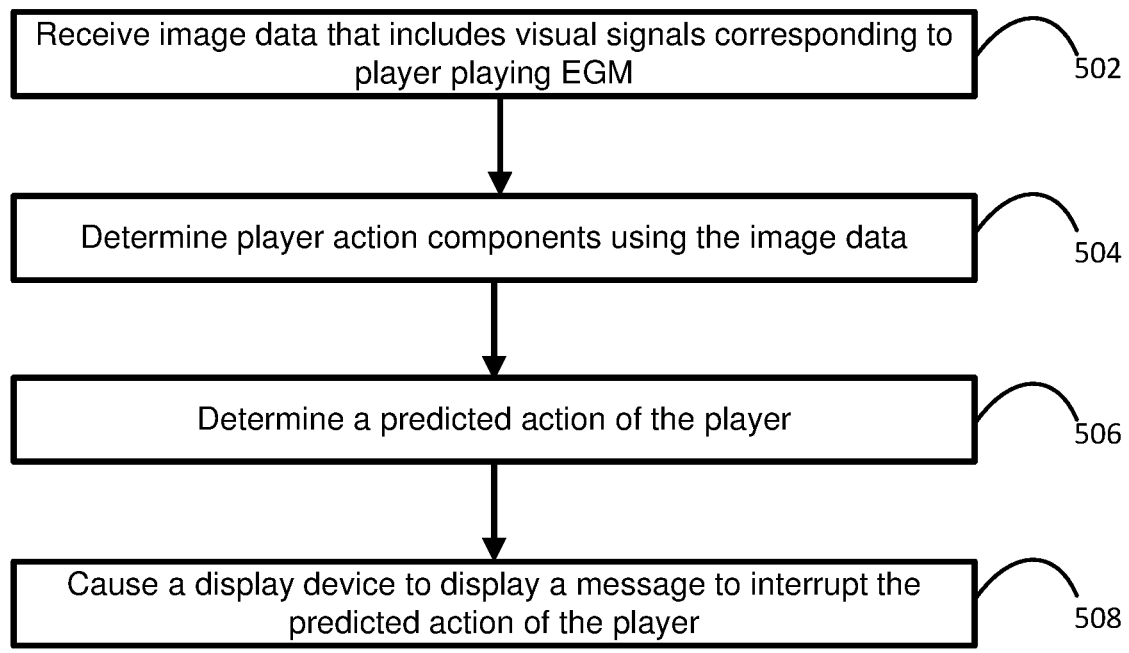
FIG. 5 is a flowchart illustrating operations of systems/methods for enhancing player experience using image data according to some embodiments.

Reference is now made to FIG. 5, which is a flowchart illustrating operations of systems/methods for enhancing player experience using image data according to some embodiments. Operations herein include receiving (block 402), from a camera, image data that includes visual signals corresponding to a player playing an EGM. Player action components may be determined (block 504) from the image data. In some embodiments, the player action components include different player attributes that correspond to the player. For example, player attributes may include gait, walking speed, posture, head position and/or movement and/or visual focus, among others.

Operations may include determining (block 506) a predicted action of the player based on the different player attributes. Operations may further include causing (block 508) a display device to display a message to interrupt the predicted action of the player. For example, in the case a player is predicted to be considering chasing out of the EGM, the display device may be caused to offer an incentive not to cash out, such as free games or bonuses for subsequent plays.

In some embodiments, the camera captures image data corresponding to a hand of the player to determine a type of hand movement. Some embodiments provide that determining the predicted action is performed based on the type of hand movement.

Some embodiments provide that the machine-readable instructions include machine learning program code. In some embodiments, the processor circuit is caused to dynamically adapt gameplay using the machine learning program code stored in the memory.

Figure 6:
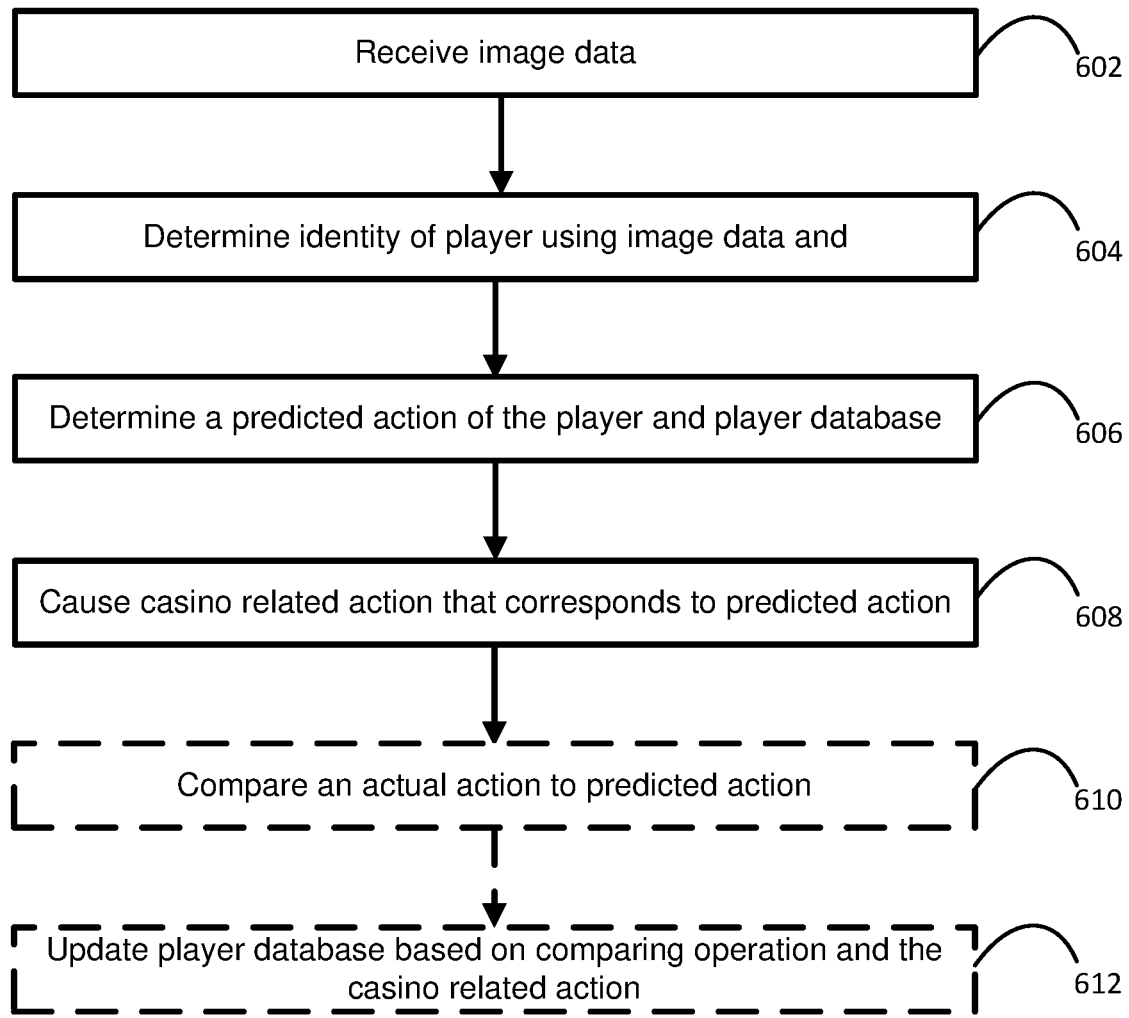
FIG. 6 is a flowchart illustrating operations of systems/methods according to some embodiments.

Reference is now made to FIG. 6, which is a flowchart illustrating operations of systems/methods according to some embodiments. Operations according to some embodiments include receiving (block 602) image data from multiple cameras. In some embodiments, the image data includes visual signals corresponding to a player in a casino. Operation may include determining (block 604) a player identity of the player using the image data. In some embodiments, the image data may be used in combination with a player database that includes stored player data for multiple players. Some embodiments provide that operations include determining (block 606) a predicted action of the player based on the image data and the player database and causing (block 608) a casino related action that corresponds to the predicted action. In some embodiments, operations may further include comparing (block 610) an actual action of the player with the predicted action of the player and updating (block 612) the player database based on the comparing operation and the casino related action. For example, if the actual action corresponds to the predicted action then a confidence factor corresponding to the predicted action may be increased. Similarly, if the actual action differs significantly from the predicted action then the confidence in future similar predictions may be reduced. In some cases, future predictions based on similar image data may be revised, modified and/or replaced in an effort to improve the accuracy of predictions.

Figure 7:
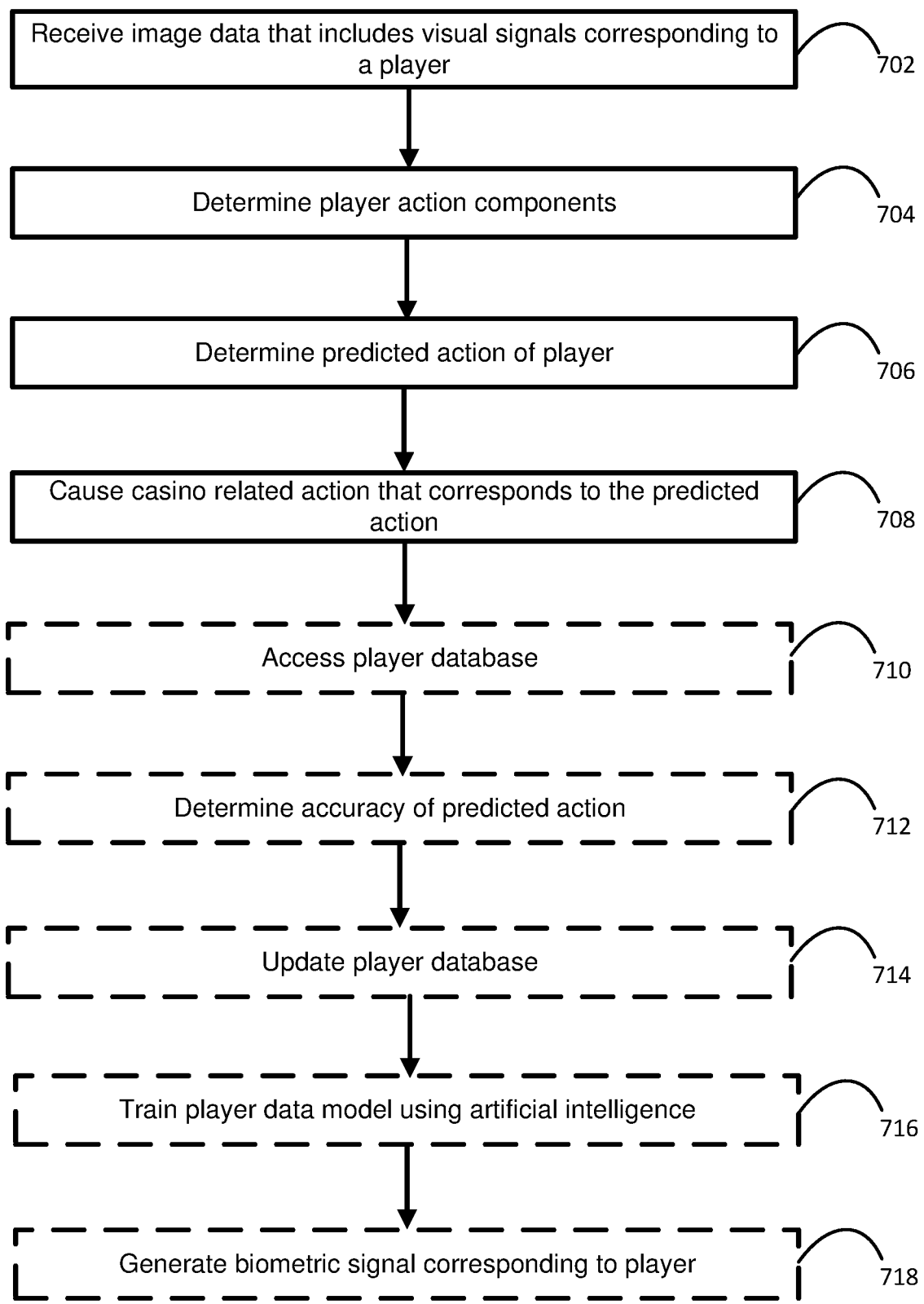
FIG. 7 is a flowchart illustrating operations of systems/methods for enhancing player experience using image data according to some embodiments.

Reference is now made to FIG. 7, which is a flowchart illustrating operations of systems/methods for enhancing player experience using image data according to some embodiments. Operations may include receiving (block 702), from a camera, image data that includes visual signals corresponding to a player and determining (block 704), from the image data, player action components that include multiple different player attributes that correspond to an emotional state of the player. In some embodiments, different player attributes include a body motion type of the player and a body posture of the player. For example, a player with a more upright posture with his head held high may indicate a more positive emotional state relative to a player with a drooping posture and head hanging low.

Operations further include determining (706) a predicted action of the player based on the different player attributes. Operations may further include causing (block 708) a casino related action that corresponds to the predicted action. In some embodiments, the predicted action of the player includes the player seeking a resource in the casino. In such embodiments, causing the casino related action may include providing, to the player, information that corresponds to the resource that the player is seeking. In some embodiments, providing the information that corresponds to the resource that the player is seeking includes transmitting or causing to be transmitted, to a mobile device that is associated with the player, a push notification that includes a message that corresponds to the resource that the player is seeking.

Some embodiments include multiple cameras that may be surveillance cameras that may each generate image data that corresponds to the player in the casino in the same location and/or in different locations. For example, a first camera may generate first image data corresponding to the player and a second camera may generate second image data corresponding to the player. Some embodiments provide that the player action components may be generated from the first image data and the second image data.

Some embodiments include receiving electronic game machine (EGM) image data that includes visual signals that correspond to the player and that are generated based on an EGM camera. In such embodiments, the player action components may be determined based on the image data and the EGM image data.

Some embodiments include accessing (block 710) a player database that includes stored player attribute data for multiple players. Operations may further include determining (block 712) an accuracy of the prediction action based on the predicted action of the player data and the stored player attribute data. Some embodiments include updating (block 714) the player database based on the accuracy that is determined. Some embodiments provide that, responsive to the determining that the accuracy of the prediction action is below a prediction value threshold, the player database may be updated. In some embodiments, determining the predicted action of the player is performed using artificial intelligence program code to analyze the different player attributes and determining the accuracy of the prediction action is performed using the artificial intelligence program code to analyze the stored player attribute data. Some embodiments include training (block 716) a player data model using artificial intelligence.

In some embodiments, the predicted action of the player includes the player deciding to cease playing an EGM and causing the casino related action includes changing a play characteristic of the EGM to incentivize the player to continue playing. In some embodiments, responsive to the predicted action including the player deciding to cease playing the EGM being based on disruption from other players near the EGM, causing the casino related action includes inviting the player to transfer to another EGM in the casino.

In some embodiments, responsive to the different player attributes that correspond to the emotional state of the player indicating that the player is in a negative emotional state after leaving an EGM, the casino related action includes transmitting, to a mobile device that is associated with the player, a message that offers free casino prizes to change the emotional state of the player.

In some embodiments, operations include receiving, from multiple cameras, image data that includes visual signals corresponding to multiple players that are playing multiple EGMS that are proximate one another. Some embodiments provide that the casino related action includes providing, using the EGMs, game play experiences that are coordinated with one another, based on the different player attributes. In some embodiments, the game play experiences that are coordinated with one another include combined game events that correspond to a collaborative game play among the players on different ones of the EGMS.

In some embodiments, systems include multiple cameras and determining the predicted action of the player includes using the cameras to determine a predicted casino destination of the player. In some embodiments, the casino related action includes causing displays in the casino to display messages to the player that are based on the predicted casino destination of the player.

In some embodiments, the different player attributes include attributes indicating that the player needs mobility assistance. In such embodiments, the casino related action includes transmitting a message to allocate resources to assist the player.

Some embodiments include a biometric sensor that generates (block 718) a biometric signal corresponding to the player. Such embodiments provide that determining the predicted action of the player is based on the different player attributes and the biometric signal.

Some embodiments provide that multiple cameras provide image data that is used to determine a player identity based on the image data received from the camera. In some embodiments, operations include tracking the player's movement through the casino using image data received from the multiple cameras.

As will be appreciated by one skilled in the art, aspects of the present disclosure may be illustrated and described herein in any of a number of patentable classes or context including any new and useful process, machine, manufacture, or composition of matter, or any new and useful improvement thereof.

EGM Components

Figure 8:
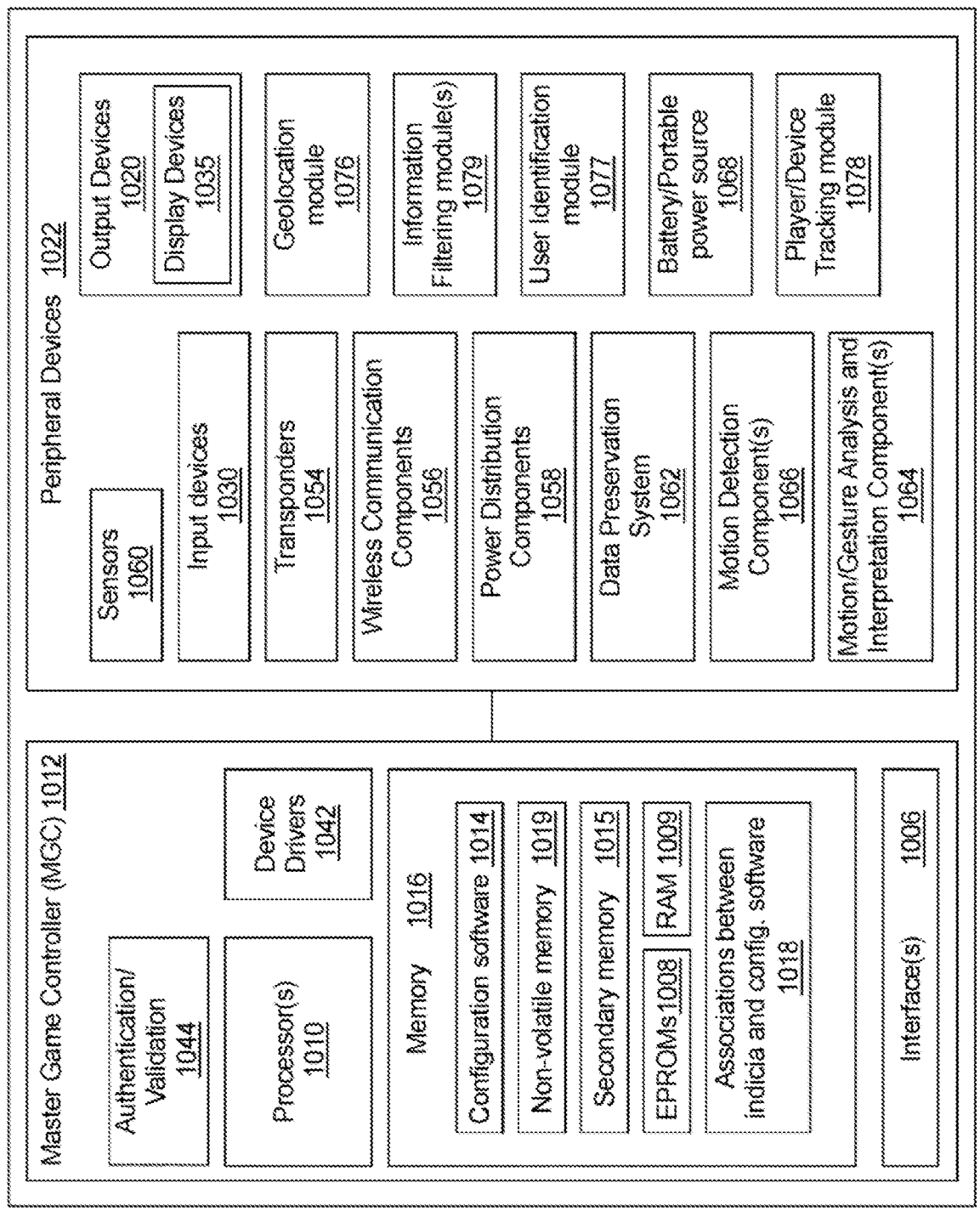
FIG. 8 is a schematic block diagram some embodiments of an electronic configuration of an example gaming system disclosed herein.
Figure 9A:
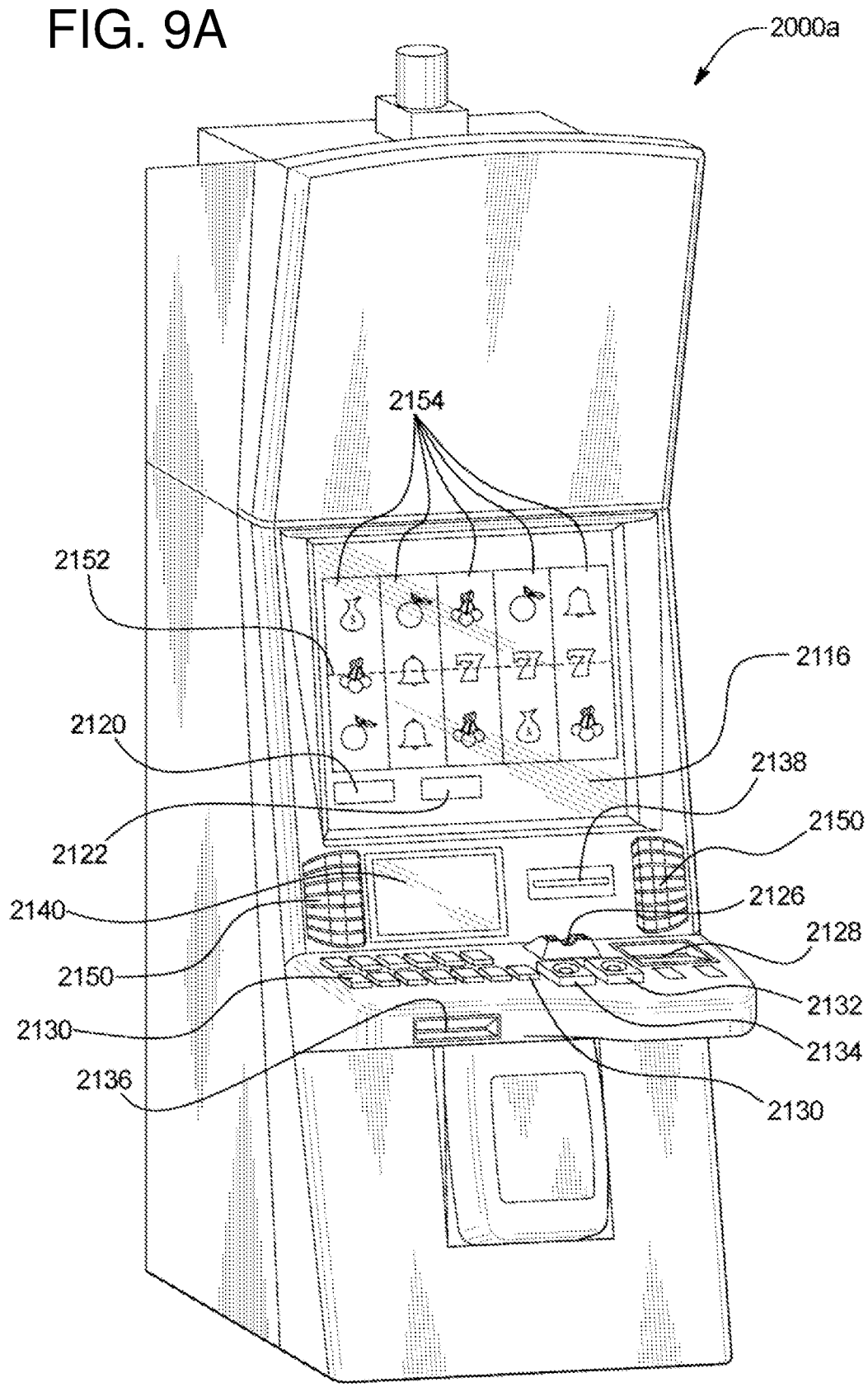
FIGS. 9A and 9B are perspective views of some embodiments of the gaming system disclosed herein.
Figure 9B:
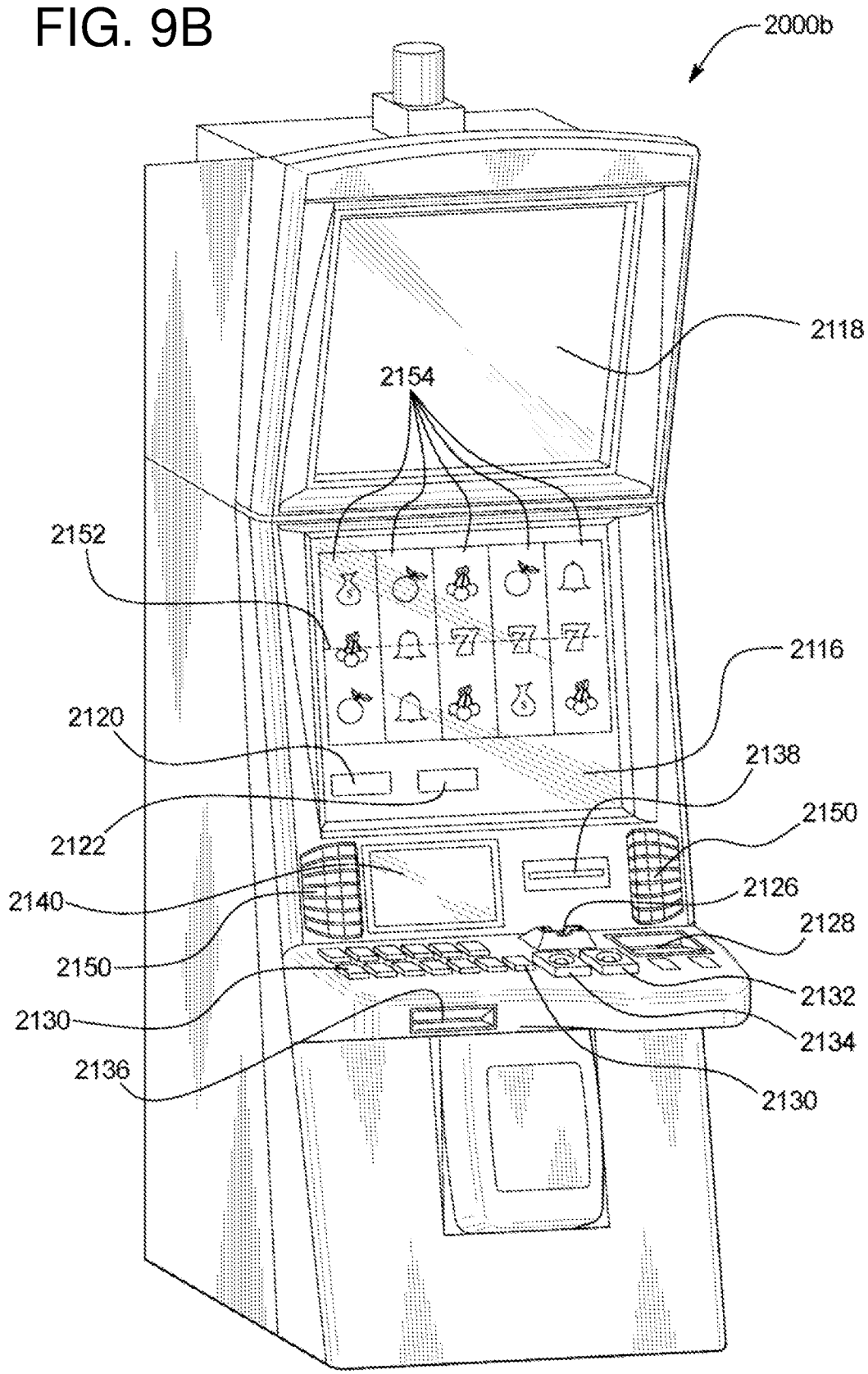
Figure 9C:
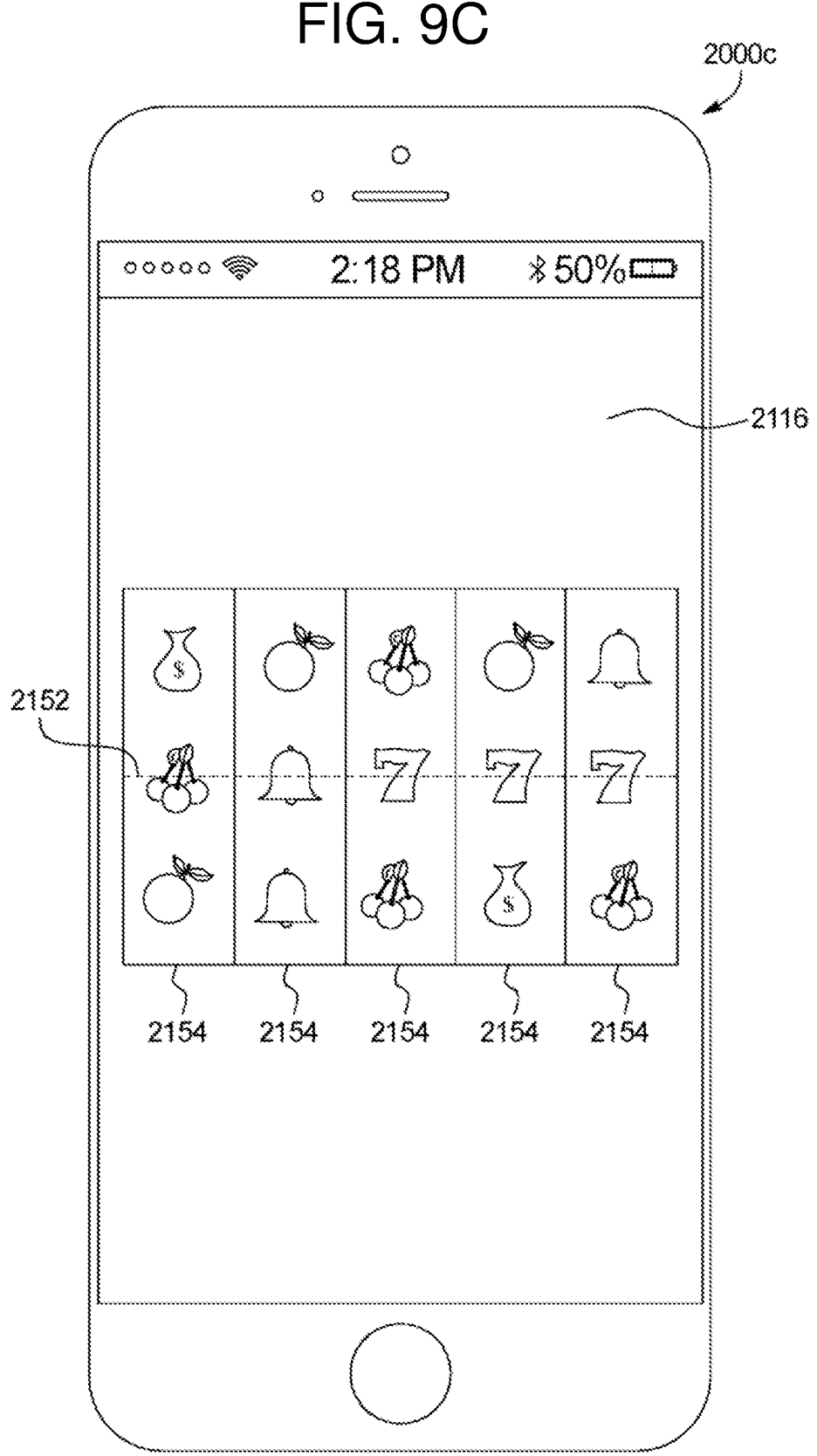
FIG. 9C is a front view of some embodiments of a personal gaming device of the gaming system disclosed herein.

FIG. 8 is a block diagram of an example EGM 1000 and FIGS. 9A and 9B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 9C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the player's computer, partly on the player's computer, as a stand-alone software package, partly on the player's computer and partly on a remote computer or entirely on the remote computer or server. In the latter scenario, the remote computer may be connected to the player's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, player input device components, information received from one or more player input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one player identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 9A includes a central display device 2116, a player tracking display 2140, a credit display 2120, and a bet display 2122. The example EGM 2000*b* illustrated in FIG. 9B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 9A and 9B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 9A and 9B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 9A and 9B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 9A and 9B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 9A and 9B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 9A and 9B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 9A and 9B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more player input devices near the EGM. In one embodiment, a player input device docking region is provided, and includes a power distribution component that is configured to recharge a player input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., player input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one player identification module 1077 is configured to determine the identity of the current player or current owner of the EGM. For example, in one embodiment, the current player is required to perform a login process at the EGM in order to access one or more features. Alternatively, the EGM is configured to automatically determine the identity of the current player based on one or more external signals, such as an RFID tag or badge worn by the current player and that provides a wireless signal to the EGM that is used to determine the identity of the current player. In at least one embodiment, various security features are incorporated into the EGM to prevent unauthorized players from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 9A and 9B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 9A and 9B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 9B includes a payline 2152 and a plurality of reels 2154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique playername and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area.

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:
a processor circuit; and
a memory comprising machine-readable instructions that, when executed by the processor circuit, cause the processor circuit to:
receive, from a camera, image data that corresponds to a player;
determine player action components from the image data, the player action components comprising a plurality of different player attributes that correspond to an emotional state of the player;
based on the plurality of different player attributes, determine a predicted action of the player; and
cause a casino related action that corresponds to the predicted action,
wherein the predicted action of the player comprises the player seeking a resource in the casino,
wherein causing the casino related action comprises providing, to the player, information that corresponds to the resource that the player is seeking,
wherein the camera comprises a first camera of a plurality of cameras,
wherein determining the predicted action of the player comprises using the plurality of cameras to determine a predicted casino destination of the player, and
wherein the casino related action comprises causing displays in the casino to display messages to the player that are based on the predicted casino destination of the player.

2. The system of claim 1, wherein providing the information that corresponds to the resource that the player is seeking comprises transmitting, to a mobile device that is associated with the player, a push notification that comprises a message that corresponds to the resource that the player is seeking.

3. The system of claim 1, wherein the first camera comprises a first premises surveillance camera that generates first image data corresponding to the player in a first location in a casino,
wherein the plurality of cameras comprises a second camera that comprises a second premises surveillance camera that generates second image data corresponding to the player in a second location in the casino, and
wherein the processor circuit is caused to determine player action components from the first image data and the second image data.

4. The system of claim 1, wherein the processor circuit is further caused to:
receive electronic game machine (EGM) image data that corresponds to the player and that are generated based on an EGM camera,
wherein the processor circuit is caused to determine player action components from the image data and the EGM image data.

5. The system of claim 1, wherein the plurality of different player attributes comprises a body motion type of the player and a body posture of the player.

6. The system of claim 1, wherein the processor circuit is further caused to access a player database comprising stored player attribute data for a plurality of players,
wherein based on the predicted action of the player data and the stored player attribute data, determining an accuracy of the prediction action, and
wherein, responsive to the determining that the accuracy of the prediction action is below a prediction value threshold, updating the player database.

7. The system of claim 6, wherein determining the predicted action of the player is performed using artificial intelligence program code to analyze the plurality of different player attributes, and
wherein determining the accuracy of the prediction action is performed using the artificial intelligence program code to analyze the stored player attribute data.

8. The system of claim 1,
wherein the predicted action of the player comprises the player deciding to cease playing an EGM, and
wherein causing the casino related action comprises changing a play characteristic of the EGM to incentivize the player to continue playing.

9. The system of claim 8, wherein, responsive to the predicted action comprising the player deciding to cease playing the EGM being based on disruption from other players near the EGM, causing the casino related action comprises inviting the player to transfer to another EGM in the casino.

10. The system of claim 1, wherein responsive to the plurality of different player attributes that correspond to the emotional state of the player indicating that the player is in a negative emotional state after leaving an EGM, the casino related action comprises transmitting, to a mobile communication device that is associated with the player, a message that offers free casino prizes to change the emotional state of the player.

11. The system of claim 1, wherein the processor circuit is further caused to receive, from a plurality of cameras, image data that corresponds to a plurality of players that are playing a plurality of EGMS that are proximate one another,
wherein based on the plurality of different player attributes, the casino related action comprises providing, using the plurality of EGMs, game play experiences that are coordinated with one another.

12. The system of claim 11, wherein the game play experiences that are coordinated with one another comprise combined game events that correspond to a collaborative game play among the plurality of players on different ones of the plurality of EGMS.

13. The system of claim 1
wherein determining the predicted action of the player comprises using the plurality of cameras to determining a predicted casino destination of the player, and
wherein the casino related action comprises causing displays in the casino to display messages to the player that are based on the predicted casino destination of the player.

14. The system of claim 1, wherein the plurality of different player attributes comprise attributes indicating that the player needs mobility assistance, and wherein the casino related action comprises transmitting a message to allocate resources to assist the player.

15. The system of claim 1, further comprising a biometric sensor that generates a biometric signal corresponding to the player, and
wherein determining the predicted action of the player is based on the plurality of different player attributes and the biometric signal.

16. The system of claim 1,
wherein the processor is further caused to determine a player identity based on the image data received from the camera, and
wherein the processor is further caused to track the player's movement through the casino using image data received from the plurality of cameras.

17. An EGM comprising:
a processor circuit;
a camera; and
a memory comprising machine-readable instructions that, when executed by the processor circuit, cause the processor circuit to:
receive, from the camera, image data that corresponds to a player playing the EGM;
determine player action components from the image data, the player action components comprising a plurality of different player attributes that correspond to the player;
based on the plurality of different player attributes, determine a predicted action of the player; and
cause a display device to display a message to interrupt the predicted action of the player,
wherein the camera comprises a first camera of a plurality of cameras,
wherein determining the predicted action of the player comprises using the plurality of cameras to determine a predicted casino destination of the player, and wherein the casino related action comprises causing displays in the casino to display messages to the player that are based on the predicted casino destination of the player.

18. The EGM of claim 17, wherein the camera captures image data corresponding to a hand of the player to determine a type of hand movement, wherein determining the predicted action is performed based on the type of hand movement,
wherein the machine-readable instructions comprise machine learning program code, and
wherein the processor circuit is caused to dynamically adapt gameplay using the machine learning program code stored in the memory.

19. A method comprising:
receiving, from a plurality of cameras, image data that corresponds to a player in a casino;
determining a player identity of the player using the image data and a player database comprising stored player data for a plurality of players;
determining a predicted action of the player based on the image data and the player database;
causing a casino related action that corresponds to the predicted action;
comparing an actual action of the player with the predicted action of the player; and
updating the player database based on the comparing operation and the casino related action,
wherein the player database is updated based on an accuracy that is determined,
wherein determining the predicted action of the player is performed using artificial intelligence program code to analyze the different player attributes and determining the accuracy of the prediction action is performed using the artificial intelligence program code to analyze the stored player attribute data,
wherein determining the predicted action of the player comprises using the plurality of cameras to determine a predicted casino destination of the player, and
wherein the casino related action comprises causing displays in the casino to display messages to the player that are based on the predicted casino destination of the player.

* * * * *